United States Patent [19]

Bourdel

[11] Patent Number: 4,810,515
[45] Date of Patent: Mar. 7, 1989

[54] PROCESS FOR THE TREATMENT OF MEAT DURING REFRIGERATION

[75] Inventor: Jacques A. J. Bourdel, St Martin D'Uriage, France

[73] Assignee: Cooperative Agricole des Eleveurs de la Region de Lamba l Amballe Dite C.O.O.P.E.R.L., Lamballe, France

[21] Appl. No.: 943,611

[22] Filed: Dec. 18, 1986

[30] Foreign Application Priority Data

Dec. 20, 1985 [FR] France .................. 85 19198

[51] Int. Cl.⁴ .................. A23L 3/36; F25D 17/02
[52] U.S. Cl. .................. 426/524; 62/64; 426/506
[58] Field of Search .................. 426/524, 506; 62/64, 62/65

[56] References Cited

U.S. PATENT DOCUMENTS 2,065,358 12/1936 Zavotschenzeff .................. 62/64

Primary Examiner—George Yeung

[57] ABSTRACT

Reduction of loss of water from meat during quick refrigeration.

The meat follows a path passing through a series of mist cabins (1) in which they are subjected to successive gusts of sterilized water mist whose particle size is between thirty and one hundred micrometers.

This treatment improves the surface appearance of the meat by limiting surface dehydration.

11 Claims, 3 Drawing Sheets

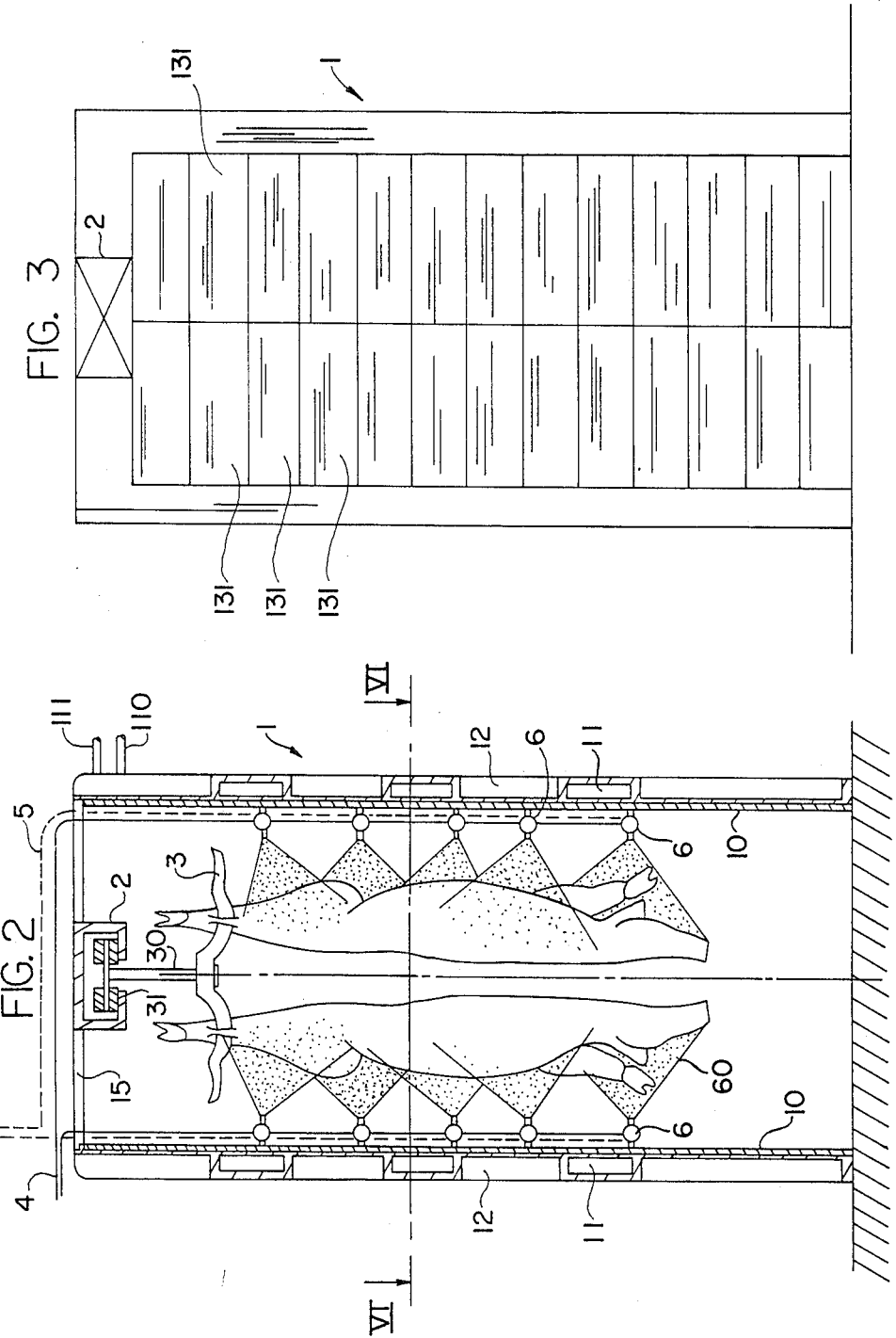

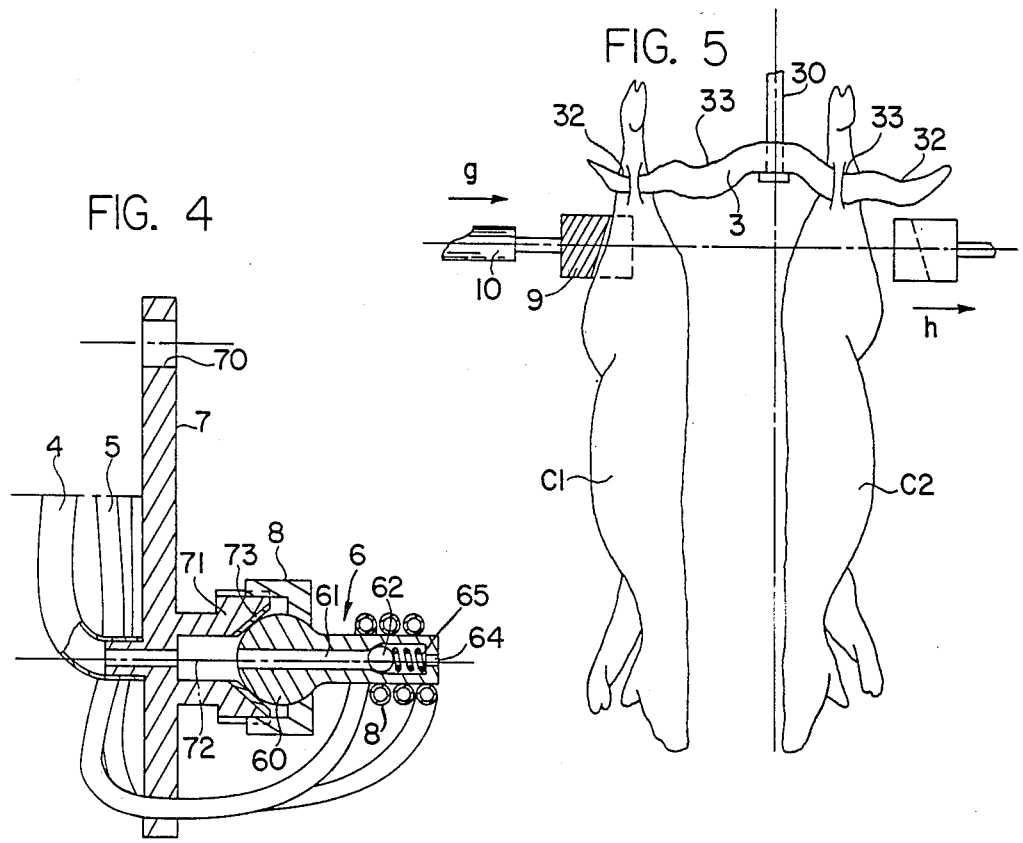
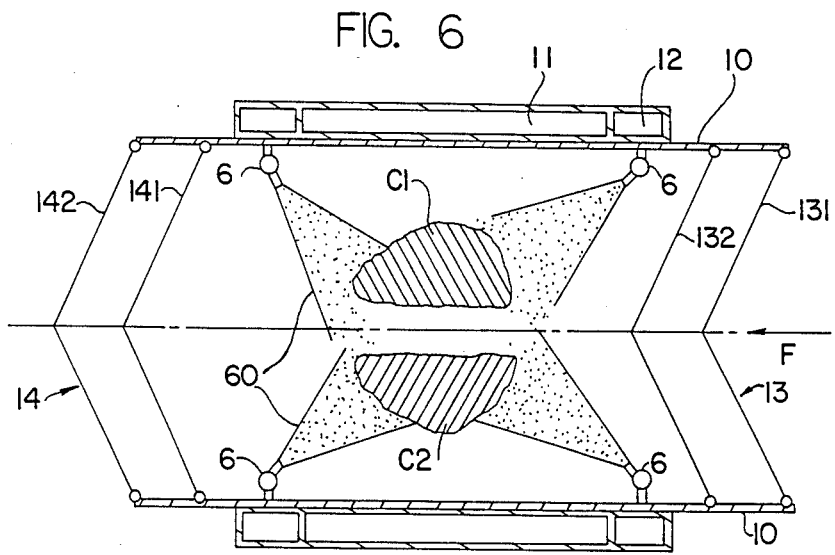

PROCESS FOR THE TREATMENT OF MEAT DURING REFRIGERATION

The present invention relates to a process and an installation for the treatment of meat during refrigeration, the purpose of this treatment being the reduction of the loss of water from the meat.

Immediately after the slaughter of animals for butcher's or pork-butcher's meat, the carcasses are subjected to quick refrigeration in slaughterhouses. This operation, usually called "cold shock" or "quick cooling off", consists in bringing the animal's body from a temperature of about 40° C. to one close to +7° C. within a relatively short time (of the order of 1½ to 2 hours), and has the effect of considerably improving the quality and keeping properties of the meat by preventing the premature formation of microbes.

At the end of this quick refrigeration the carcasses are either directly stored in cold rooms or refrigerated trucks, or are cut up; in the latter case, the various cuts are at a favorable temperature for storage or direct packing for shipment.

It has been found that this quick refrigeration of carcasses while they were still warm gave rise to surface dehydration of the meat, which entailed a relatively great loss of water. Thus, for example for a pig's carcass the mass lost may be as much as 1 kilogram per pig. This surface dehydration is observed to a depth of about 2 mm; it results in the wrinkling of the meat cuts, thus impairing the appearance of the carcasses.

The present invention seeks to solve this problem by proposing treatment of the carcasses during their refrigeration to enable water loss to be reduced.

According to the present invention this result is achieved in that, as the temperature of the meat is lowered, its surface is subjected to successive gusts of sterilized water mist. The meat is thus regularly periodically enveloped in a water saturated atmosphere which prevents, or at least substantially reduces, its surface dehydration.

Experience has shown that a particularly interesting result is obtained when the mean diameter of the droplets of the diffused mist is between ten and two hundred micrometers and preferably between thirty and one hundred micrometers; this diameter may be progressively reduced during the course of the treatment, the droplets advantageously being the finer, the lower the temperature of the carcass treated.

In cases where the duration of the refrigeration is of the order of 1½ to 2 hours, the meat is exposed to a number of successive gusts which is advantageously between ten and fifty, for example of the order of thirty.

It may in addition be advantageous to subject the meat, before the treatment, to sprinkling with salted water (physiological salt solution); this initial deposition of salt prevents the bursting of cells through osmotic pressure and thus improves the preservation of the colour of the meat.

The installation according to the invention, which enables this process to be carried out, comprises a refrigeration room of known type, in which a meat conveying system operates; according to the invention this installation is equipped with a series of mist cabins situated inside the refrigeration room and disposed on the path of the meat. Each of these cabins contains a plurality of atomizer nozzles which are arranged to diffuse a gust of sterilized water mist over the surface of the meat when the latter passes into the cabin.

In a preferred embodiment, which is more particularly intended for treating half-carcasses of animals, the two side walls of the cabins, that is to say the walls situated on each side of the path followed by the meat, are each provided with a set of atomizer nozzles, the latter being directed towards the center of the cabin. As the result of this arrangement, the entire carcass is enveloped in a cloud of mist as it passes through a cabin.

These walls are advantageously in the form of a hollow frame in which circulates an antifreeze liquid preventing the walls from frosting up or enabling them to be defrosted at the end of the day.

The front and rear faces are preferably closed by flexible, resilient aprons, the purpose of which is to limit the escape of the mist from the cabins, while of course allowing the meat to pass through.

According to an interesting characteristic of the invention the atomizer nozzles are mounted on ball joints and can therefore be pointed in all directions; in addition, they are advantageously mounted on vertically and/or horizontally adjustable supports and are regulable in respect of flow and particle size. It is therefore possible for the position, direction and force of the jets and the fineness of the mist to be adapted as desired to the shape and nature of the carcasses and pieces of meat concerned.

The sterilized water atomization jets are protected against freezing by a coil surrounding their diffusion head and carrying a circulating heat transfer medium, such as alcohol, for example.

Other characteristics and advantages of the invention will emerge from the description given below and from the accompanying drawings, which illustrate, as a non-limitative example, a preferred embodiment thereof.

FIG. 2 shows a mist cabin in section in a vertical plane extending transversally of the path followed by the meat;

FIG. 3 is a front view of a mist cabin;

FIG. 4 is a detail view showing in section an atomizer nozzle mounted on a support;

FIG. 5 is a view intended to explain how two half-carcasses are moved towards one another on a gambrel provided with two pairs of notches and forming part of the equipment of the meat conveying system in the installation;

FIG. 6 is a sectional plan view of the mist cabin shown in FIGS. 2 and 3, the plane in which the section is taken being designated VI—VI in FIG. 2.

Figure 1:
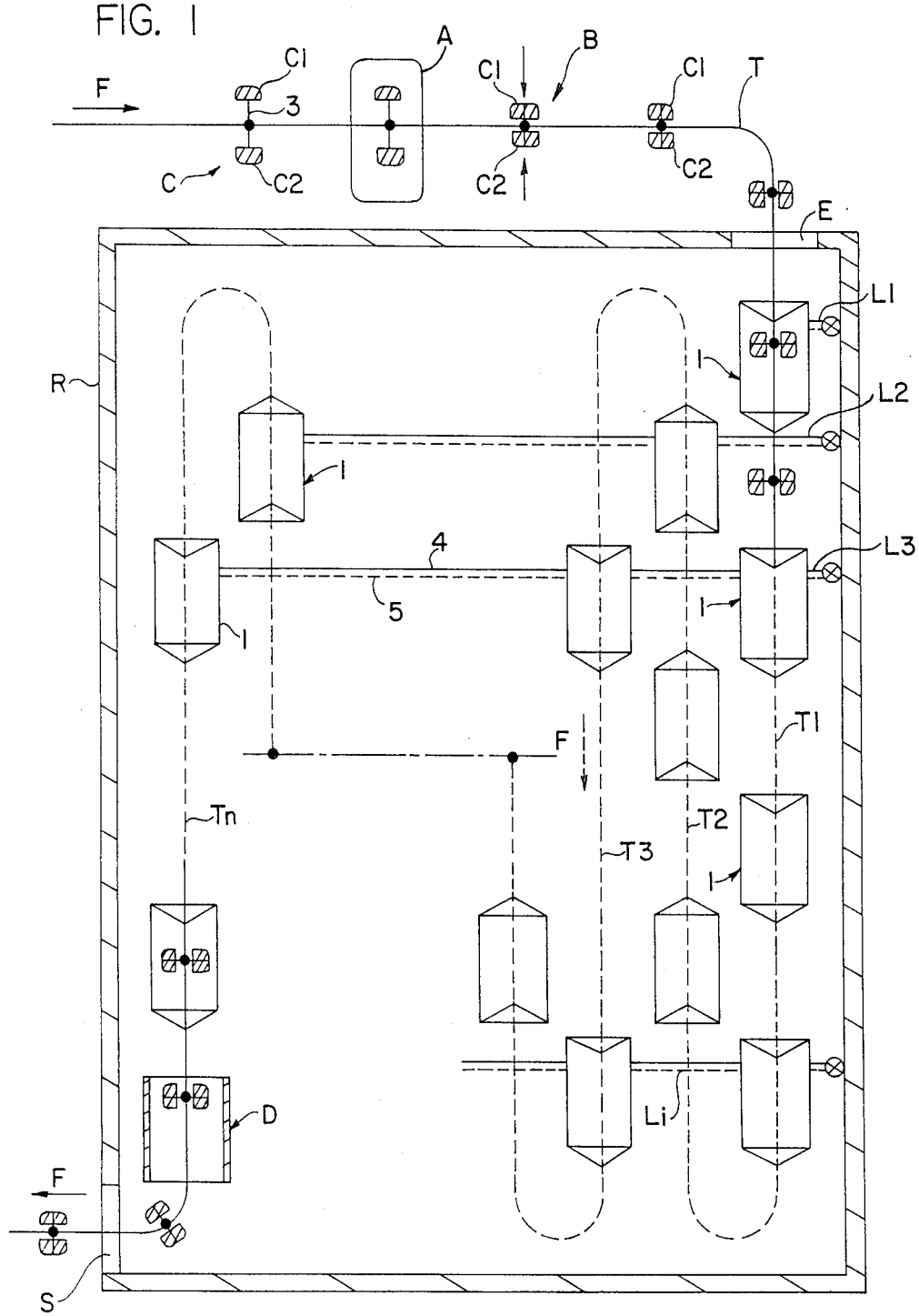
FIG. 1 is a general schematic plan view of an installation according to the invention.

The refrigeration room R shown in FIG. 1 is a rectangular chamber of large dimensions, in which the temperature is between +3° and −6° approximately. This refrigeration room is intended for the "cold shock" refrigeration of freshly slaughtered animal carcasses, for example pig carcasses. For this purpose the refrigeration room contains a conveying system of conventional type, which moves the carcasses along a serpentine path T of a total length equal to about 500 meters inside the room R; the speed of travel of the carcasses is so selected that the residence time of the carcasses in the refrigeration room is of the order of 1 hour 45 minutes. This conveying system comprises a rail 2, the contour of which corresponds to that of the path T and which guides a series of gambrels 3 on which the carcasses are suspended; the rail 2 enters the room R via an inlet door E and leaves via an outlet door S. The different portions of trajectory parallel to one another inside the room R are designated $T_1, T_2, T_3, \ldots T_n$.

Upstream of the refrigeration room are disposed a station for sprinkling the carcasses with salted water, designated A, and a machine, designated B, for moving the half-carcasses close to one another and orienting them.

Inside the refrigeration room R the path T for the conveying of the carcasses passes through a series of cabins 1, the total number of which is of the order of thirty; it will be noted that the distance between the cabins increases in the direction of movement of the carcasses on the path T. The first portion of path $T_1$ for example contains four cabins, the second portion $T_2$ contains three cabins, while each of the additional portions contains only two cabins.

The cabins 1 are fed with sterilized water and with heat transfer medium through pipes 4 and 5 respectively which are disposed along lines $L_1, L_2, L_3 \ldots L_i$ extending transversely in relation to the parallel path portions $T_1, T_2, T_3 \ldots T_n$.

In FIG. 1, which is a schematic general view of the installation, some of the path portions and some of the lines have been omitted in order not to overburden the drawing needlessly.

After passing through all the cabins 1, the path of the carcasses passes through a drying tunnel D before leaving the room R through the outlet S; in the drawings the direction of movement of the carcasses is indicated by arrows F.

FIGS. 2, 3 and 6 show the structure of a mist cabin 1.

This cabin is in the form of a tunnel comprising two vertical side walls 10 and a top 15 which supports the conveyor rail 2.

Each side wall 10 is provided with a certain number of atomizer nozzles 6, of which there are for example five. These nozzles are distributed over the height and the width of the walls 10, in an appropriate manner depending on the shape of the carcasses. They are fed with sterilized water by way of pipes 4, and with heat transfer medium, intended to prevent them from frosting up, by way of the pipes 5.

The side walls 10 comprise a hollow frame consisting of vertical tanks 12 and transverse horizontal tanks 11, said tanks being adapted to receive circulating antifreeze liquid; the inlet and outlet pipes for said antifreeze liquid in the cabin bear the references 110, 111.

The gambrels 3, the shape and function of which will be described in greater detail later on, are suspended on the rail 2 by means of a rod 30 mounted on rollers 31; a drive device of conventional type, for example a chain drive, drives the rollers 31 in the rail 2, thus moving the gambrels continuously along the rail.

The front and rear faces of the cabin 1 are closed by flexible, resilient aprons given the general references 13 and 14. These flexible aprons, of polyethylene or similar material, are in the form of strips disposed vertically in such a manner as to form continuous walls; these walls constitute two parallel dihedrals (having the shape of chevrons when viewed from above); the arris of these dihedrals is directed towards the downstream side of the path of the carcasses.

FIG. 4 is a detail view of an atomizer nozzle mounted on a support. The support, designated 7, has a hole 70 enabling it to be fixed, preferably adjustably, on the wall 10 of the cabin. The atomizer nozzle, given the general reference 6, is for example made of tungsten carbide. It has a water supply bore 61 closed by a ball valve 62 loaded by a spring 65; the nozzle has a preferably adjustable outlet jet 64. The portion 60 of this nozzle which is situated at the opposite end to the nozzle 64 is in the form of a ball 60 held captive against a conical seat 71 on the support 7 by means of a nut 8 screwed onto said support. A seal 73 is interposed between the ball 60 and the support seat 71. The support has in turn a bore 72 adapted to receive the sterilized water supply pipe 4 and disposed in line with the bore 61 in the atomizer nozzle.

The operative end of the nozzle 6 (where the valve 62 and the jet 64 are situated) is surrounded by a coil 8 connected to the pipe 5 carrying the previously mentioned heat transfer medium. The ball 60 constitutes a ball joint for the nozzle 6, enabling jets of atomized water to be oriented in all directions inside the cabin 1.

The different control means intended for supplying sterilized water to the nozzles 6, and also the devices circulating the heat transfer medium in the coil 8 and the antifreeze liquid in the frame 11-12 of the cabins, are means the designing of which is within the scope of those skilled in the art; these means have been omitted from the drawings solely for the sake of simplification.

FIG. 5 shows a gambrel 3 intended for equipping the installation according to the invention. This gambrel is composed of two generally horizontal branches disposed symmetrically in relation to the axis of the vertical suspension rod 30; each of these branches has two notches 32, 33 situated respectively at the free end of the branch and in the central portion of the latter. The branches of the gambrel 3 each enable a half-carcass of a pig to be suspended by a hamstring. These half-carcasses may be situated in the positions close to or distant from one another, depending on whether they are suspended in one or the other of the pairs of notches 33, 32.

FIG. 5 is intended to illustrate the manner in which two half-carcasses $C_1, C_2$ are moved close to one another on a gambrel; the device enabling this to be done comprises two pairs of presser shoes 9, the shape of which is adapted to cooperate with the ham portion of a half-carcass situated just below the gambrel. The shoes 9 are carried by horizontal displacement means 10, for example in the form of hydraulic jacks.

When the two carcasses $C_1, C_2$ are in the positions remote from one another (supported by the end notches 32), and if it is desired to move them close to one another, the gambrel is brought opposite the presser shoes 9. The jacks 10 are extended in such a manner as to push the two half-carcasses $C_1, C_2$ towards one another until they are positioned in the notches 33. In FIG. 5 the half-view on the left shows the commencement of the operation of moving the half-carcasses towards one another (extension of the jack indicated by the arrow g); the half-view on the right shows the end of the operation, the retraction of the shoe 9 being indicated by the arrow h.

A description will now be given of the manner in which the carcasses of pigs are treated by means of the installation which has just been described.

In the first place, the nozzles are oriented and adjusted inside the series of cabins 1 in such a manner that the jets of mist can correctly and completely envelop the half-carcasses $C_1, C_2$ as they pass through these cabins. The jets 64 of the nozzles 6 are designed, or adjusted when they are adjustable, in such a manner that the mean diameter of the atomized droplets will be between thirty and one hundred micrometers; this preliminary adjustment is preferably such that the diameter of the droplets decreases in proportion as the carcasses travel through the refrigeration room R. Thus, for the first five cabins there will be a mean droplet diameter of the order of one hundred micrometers, for the next five cabins a mean diameter of the order of fifty micrometers, and for the remaining twenty cabins a mean diameter of the order of thirty micrometers.

The carcasses C, consisting of two half-carcasses $C_1$, $C_2$ arrive in the installation on the conveying gambrels 3; the two half-carcasses $C_1$, $C_2$ are at that moment in the positions remote from one another on the gambrels because of the treatment to which the carcass has just been subjected, namely the removal of internal organs after the splitting of the carcass. This removal operation is in fact facilitated when the two half-carcasses are well spaced apart. The carcasses arriving in the installation have generally been given a preliminary treatment intended to remove their hair by immersion in scalding tanks and by singeing. The temperature inside the carcasses is of the order of 40° C. The pig carcasses then pass to a station A, where they are sprinkled with sterilized salted water; the purpose of this sprinkling is to wash the carcasses and to deposit on them a certain amount of salt, which is advantageous to the good preservation of the colour of the meat. This sprinkling is advantageously timer controlled, that is to say triggered automatically at the moment when the carcasses pass, through the action of appropriate detectors. After this sprinkling the two half-carcasses are automatically brought closer to one another at station B, which is equipped with the presser shoes 9 previously described. In this station suitable means (not shown) also effect the correct orientation and locking of the gambrels on their rods, in such a manner as to achieve accurate positioning of the carcasses and to ensure reproducible operation of the installation. The two pig half-carcasses $C_1$, $C_2$, situated in the close-up positions on their gambrels, then enter the refrigeration room R through the door E and will in succession pass through all the cabins 1 in the course of the "cold shock" treatment. The two half-carcasses are allowed to enter a cabin through the deformation of the flexible aprons 131, 132 forming the front face of the cabin. With the aid of timer control means and of means detecting the arrival of the gambrels, the nozzles 6 are operated automatically to diffuse a gust of mist which envelops the carcasses $C_1$, $C_2$ at the moment when they pass into the cabin. These jets, which are generally flat, are given the reference numeral 60 in FIGS. 2 and 6. The jet of mist emitted lasts only a few seconds, for example three seconds. These very fine droplets will cover the entire surface of the meat, and will then evaporate through the action of the heat of the meat and will maintain in their vicinity a very high humidity corresponding to the temperature of the environment. When these droplets have almost all evaporated, the meat carcasses will have arrived at the next cabin, where the operation is repeated, and so on.

Because of the high temperature of the carcasses, the evaporation is naturally faster at the commencement of the treatment. It is for that reason that the cabins 1 are more closely spaced in the first part of the path T.

The particle size of the mist emitted by the atomizer nozzles is very important. If the drops are too large, a great mass of water is required to cover the meat, and this will entail streams of water detrimental to its appearance; in addition, humidity will be more difficult to maintain over the entire surface. If the drops are too fine, they will be entrained by the currents of air of the suction system in the refrigeration room and moreover will adhere badly to the surface of the meat; furthermore, evaporation will occur "too quickly". Experience has shown that the optimum diameter of the drops was between thrrty and one hundred micrometers, and that it was desirable to use larger drops at the beginning, that is to say when the temperature of the carcasses was high in relation to the temperature of the refrigeration room.

The total treatment time, that is to say the total time of the emission of jets of mist per carcass is between fifty and one hundred seconds, which is very short in relation to the refrigeration time (about 1 hour 45 minutes).

At the end of the treatment, before the carcasses leave the room R, it is advantageous to pass them through a small tunnel D effecting very rapid drying and serving to form a light dehydrated film on the surface of the meat, thereby assisting good preservation.

With the aid of the process and the installation according to the invention, it is possible to reduce the loss of mass of water to about 200 grams per pig (as against 1 kilogram), thus considerably improving the appearance of the meat produced.

This technique permits a method of refrigeration (through the choice of higher evaporation temperatures) different from traditional methods, thereby enabling substantial savings of energy to be obtained.

It will be noted that water and heat transfer medium (for example alcohol) for the purpose of preventing the frosting-up of the nozzles are supplied through the transverse lines $L_1$, $L_2$, $L_3$ ... $L_f$. As the result of this arrangement, if one of these lines or its control means should fail, it is nevertheless possible to operate the installation without fundamentally impairing the quality of the treatment; because of this arrangement, in fact, only certain cabins, regularly distributed along the path of the carcasses, would not be able to operate.

It is obvious that the invention described above is not limited to the preferred embodiment just described; on the contrary, it includes all variants thereof.

This invention can thus of course be applied to various kinds of meat and not solely to carcasses of pigs; it could in particular be applied to carcasses of bovines and sheep, or even to smaller animals, such as rabbits or chickens.

It is obvious that the shape and dimensions of the mist cabins, and also the number and situation of the atomizer nozzles will be adapted to the type of product treated.

The different parts of the installation could of course also be protected by electrical means against frost; this applies in particular to the atomizer nozzles.

The final drying of the carcasses could be effected without the tunnel D, simply by dehydration by cold in the refrigeration room, after they pass out of the series of cabins.

I claim:

1. Process for the treatment of meat during refrigeration for the purpose of reducing loss of water and comprising the steps of moving the meat through a chilling chamber to lower the temperature of the meat, and subjecting the surface of the meat to successive gusts of sterilized water mist composed of droplets having a mean diameter between 10 to 200 micrometers while the meat is moved through the chilling chamber.

2. Process as set forth in claim 1 wherein the step of subjecting the surface of the meat to successive gusts is further characterized as subjecting the surface of the meat to successive gusts of sterilized water mist composed of droplets having a mean diameter between 30 to 100 micrometers.

3. Process as set forth in claim 2 wherein the step of subjecting the surface of the meat to successive gusts is further characterized as subjecting the surface of the meat to between 10 to 50 successive gusts.

4. Process as set forth in claim 3 wherein the step of subjecting the surface of the meat to successive gusts is further characterized as subjecting the surface of the meat to at least 30 gusts.

5. Process as set forth in claim 1 wherein the step of subjecting the surface of the meat to successive gusts is further characterized as subjectingt the surface of the meat to at least 30 gusts.

6. Process as set forth in claim 1 including the additional step of maintaining each gust of sterilized water mist for a duration between 1 and 5 seconds.

7. Process as set forth in claim 1 including the additional step of decreasing the mean diameter of the mist droplets during the course of the treatment.

8. Process as set forth in claim 1 including the additional step of sprinkling salted water on the meat.

9. Process for the treatment of meat during refrigeration for the purpose of reducing loss of water and comprising the steps of conveying the meat along a path through a refrigeration room and through a series of successive mist cabins located within said refrigeration room and along said path to lower the temperature of the meat, and subjecting the surface of the meat to a gust of sterilized water mist composed of droplets having a mean diameter between 10 to 200 micrometers as the meat is conveyed through each of the mist cabins.

10. Process for the treatment of meat during refrigeration for the purpose of reducing loss of water and comprising the steps of conveying the meat along a path through a refrigeration room and through a series of successive mist cabins located within said refrigeration room and along said path to lower the temperature of the meat, and subjecting the surface of the meat to a gust of sterilized water mist composed of droplets having a mean diameter between 30 and 100 micrometers as the meat is conveyed through each of the mist cabins.

11. Process for the treatment of meat as set forth in claim 8 wherein the step of sprinkling salted water on the meat is performed before the step of subjecting the surface of the meat to successive gusts of sterilized water mist.

* * * * *

UNITED STATES PATENT AND TRADEMARK OFFICE
CERTIFICATE OF CORRECTION

PATENT NO. : 4,810,515
DATED : March 7, 1989
INVENTOR(S) : MONSIEUR BOURDEL JACQUES, ANDRE, JEAN It is certified that error appears in the above-identified patent and that said Letters Patent is hereby corrected as shown below:

In the Patent heading at [73] Assignee, after "Region de" delete "Lamba 1 Amballe" and substitute --Lamba Lamballe--.

after "C.O.O.P.E.R.L., Lamballe, France, insert --part interest.--.

Signed and Sealed this

Tenth Day of July, 1990

Attest:

HARRY F. MANBECK, JR.

*Attesting Officer*  *Commissioner of Patents and Trademarks*